US010490143B2

(12) United States Patent
Kumamoto et al.

(10) Patent No.: US 10,490,143 B2
(45) Date of Patent: Nov. 26, 2019

(54) VIDEO DISPLAY DEVICE

(71) Applicant: Panasonic Intellectual Property Management Co., Ltd., Osaka (JP)

(72) Inventors: Yasuhiro Kumamoto, Osaka (JP); Takeichi Shinya, Osaka (JP); Koujirou Higa, Osaka (JP); Masaaki Ofuji, Osaka (JP); Taizou Takeuchi, Osaka (JP); Tadahiro Kugimaru, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 15/750,883

(22) PCT Filed: Aug. 30, 2016

(86) PCT No.: PCT/JP2016/003939
§ 371 (c)(1),
(2) Date: Feb. 7, 2018

(87) PCT Pub. No.: WO2017/038080
PCT Pub. Date: Mar. 9, 2017

(65) Prior Publication Data
US 2018/0233094 A1  Aug. 16, 2018

(30) Foreign Application Priority Data

Sep. 1, 2015 (JP) .................................. 2015-172363
Mar. 10, 2016 (JP) .................................. 2016-047268

(51) Int. Cl.
F21S 2/00 (2016.01)
F21V 19/00 (2006.01)
(Continued)

(52) U.S. Cl.
CPC ......... G09G 3/36 (2013.01); G02F 1/133308 (2013.01); G02F 1/133603 (2013.01);
(Continued)

(58) Field of Classification Search
CPC .. F21S 2/00; F21V 19/00; F21V 23/00; F21V 23/06; G02F 1/133308; G02F 1/133603;
(Continued)

(56) References Cited

U.S. PATENT DOCUMENTS 6,362,801 B1 * 3/2002 Yuhara ...................... G09F 9/33
345/82
2003/0072153 A1 * 4/2003 Matsui ................. H05K 1/0281
362/231

(Continued)

FOREIGN PATENT DOCUMENTS

EP  2090924 A2  8/2009
EP  2184634 A2  5/2010
(Continued)

OTHER PUBLICATIONS

Non-Final Office Action issued in U.S. Appl. No. 15/750,881, dated Oct. 4, 2018.
(Continued)

Primary Examiner — Mihir K Rayan
(74) Attorney, Agent, or Firm — McDermott Will & Emery LLP

(57) ABSTRACT

A video display device includes a display panel that displays an image based on an image signal, and a light source substrate disposed on a rear side of the display panel. The light source substrate includes a plurality of light emitting elements disposed on a surface of the light source substrate on a side toward the display panel, and a plurality of driver elements that are disposed on the same surface of the light source substrate as the surface to which the plurality of light (Continued)

emitting elements are attached, and drive each of the plurality of light emitting elements.

7 Claims, 11 Drawing Sheets

(51) Int. Cl.
  *F21V 23/00*   (2015.01)
  *F21V 23/06*   (2006.01)
  *G09F 9/00*    (2006.01)
  *G09G 3/34*    (2006.01)
  *G02F 1/1335*  (2006.01)
  *G09G 3/36*    (2006.01)
  *G02F 1/1333*  (2006.01)
  *G09G 3/20*    (2006.01)

(52) U.S. Cl.
  CPC .............. *G02F 1/133605* (2013.01); *G02F 2001/13332* (2013.01); *G02F 2001/133314* (2013.01); *G02F 2001/133317* (2013.01)

(58) Field of Classification Search
  CPC ... G02F 1/133605; G02F 2001/133314; G02F 2001/133317; G02F 2001/13332; G02F 2001/133601; G02F 2001/133612; G09F 9/00; G09G 3/20; G09G 3/34; G09G 3/36
  See application file for complete search history.

(56) References Cited

U.S. PATENT DOCUMENTS

| | | | |
|---|---|---|---|
| 2004/0125269 A1 | 7/2004 | Kim et al. | |
| 2004/0239829 A1 | 12/2004 | Yu et al. | |
| 2005/0265051 A1 | 12/2005 | Yamamoto et al. | |
| 2006/0092346 A1* | 5/2006 | Moon | G02F 1/133603 349/61 |
| 2007/0242477 A1* | 10/2007 | Yoo | H05K 1/0206 362/612 |
| 2008/0143916 A1* | 6/2008 | Fujino | G02F 1/133603 349/58 |
| 2009/0003002 A1 | 1/2009 | Sato | |
| 2009/0021932 A1 | 1/2009 | Kim et al. | |
| 2009/0121652 A1 | 5/2009 | Kang et al. | |
| 2009/0135331 A1* | 5/2009 | Kawase | G02F 1/133605 349/58 |
| 2009/0167194 A1 | 7/2009 | Mizuta | |
| 2009/0201441 A1 | 8/2009 | Laney et al. | |
| 2009/0309498 A1 | 12/2009 | Park et al. | |
| 2009/0310335 A1* | 12/2009 | Park | G02F 1/133603 362/97.1 |
| 2010/0066752 A1 | 3/2010 | Watanuki | |
| 2010/0109562 A1* | 5/2010 | Shen | G02F 1/133603 315/294 |
| 2010/0156955 A1* | 6/2010 | Kimura | G09G 3/3426 345/690 |
| 2011/0050111 A1* | 3/2011 | Tanaka | G02F 1/133603 315/185 R |
| 2011/0063850 A1 | 3/2011 | Oide et al. | |
| 2011/0304798 A1 | 12/2011 | Tanaka et al. | |
| 2011/0310590 A1* | 12/2011 | Yamashita | G02F 1/133609 362/97.1 |
| 2012/0019490 A1* | 1/2012 | Huang | G09G 3/32 345/205 |
| 2012/0087122 A1 | 4/2012 | Takeuchi et al. | |
| 2012/0139445 A1* | 6/2012 | Fujiwara | G02F 1/133603 315/294 |
| 2012/0212682 A1 | 8/2012 | Kuromizu | |
| 2012/0218752 A1 | 8/2012 | Sumitani | |
| 2012/0293724 A1 | 11/2012 | Ueyama | |
| 2013/0069560 A1 | 3/2013 | Kurita | |
| 2013/0094187 A1 | 4/2013 | Kamada | |
| 2013/0229596 A1 | 9/2013 | Hosoki | |
| 2014/0211123 A1 | 7/2014 | Lee et al. | |
| 2018/0231838 A1* | 8/2018 | Kumamoto | F21S 2/00 |

FOREIGN PATENT DOCUMENTS

| | | |
|---|---|---|
| EP | 2492742 A1 | 8/2012 |
| EP | 3318792 A1 | 5/2018 |
| EP | 3318793 A1 | 5/2018 |
| JP | 2001-338505 A | 12/2001 |
| JP | 2005-109228 A | 4/2005 |
| JP | 2006-128125 | 5/2006 |
| JP | 2007-322697 A | 12/2007 |
| JP | 2008-166304 A | 7/2008 |
| JP | 2008-270144 A | 11/2008 |
| JP | 2009-032593 | 2/2009 |
| JP | 2009-140720 A | 6/2009 |
| JP | 2009-162952 A | 7/2009 |
| JP | 2009-222793 A | 10/2009 |
| JP | 2011-034949 A | 2/2011 |
| JP | 2012-004067 A | 1/2012 |
| JP | 2012-089509 | 5/2012 |
| JP | 2012-119436 A | 6/2012 |
| JP | 2012-174634 A | 9/2012 |
| JP | 2012-204337 A | 10/2012 |
| JP | 2012-212509 A | 11/2012 |
| JP | 2013-182076 | 9/2013 |
| JP | 2013-246988 A | 12/2013 |
| JP | 2014-041830 | 3/2014 |
| JP | 2014-067679 A | 4/2014 |
| JP | 2014-149529 A | 8/2014 |
| WO | 2008/156020 A1 | 12/2008 |
| WO | 2010/101062 A1 | 9/2010 |
| WO | 2011/058903 A1 | 5/2011 |

OTHER PUBLICATIONS

International Search Report of PCT application No. PCT/JP2016/003943 dated Nov. 8, 2016.
International Search Report of PCT application No. PCT/JP2016/003941 dated Nov. 8, 2016.
International Search Report of PCT application No. PCT/JP2016/003942 dated Nov. 22, 2016.
International Search Report of PCT application No. PCT/JP2016/003940 dated Nov. 8, 2016.
International Search Report of PCT application No. PCT/JP2016/003945 dated Nov. 22, 2016.
The Extended European Search Report dated Sep. 24, 2018 for the related European Patent Application No. 16841119.7.
The Extended European Search Report dated Jun. 19, 2018 for the related European Patent Application No. 16841114.8.
The Extended European Search Report dated Jun. 26, 2018 for the related European Patent Application No. 16841115.5.
The Extended European Search Report dated Jun. 22, 2018 for the related European Patent Application No. 16841116.3.
The Extended European Search Report dated Jun. 28, 2018 for the related European Patent Application No. 16841117.1.
The Extended European Search Report dated Jun. 14, 2018 for the related European Patent Application No. 16841118.9.
The Partial Supplementary European Search Report dated Jun. 27, 2018 for the related European Patent Application No. 16841119.7.
International Search Report of PCT application No. PCT/JP2016/003939 dated Nov. 22, 2016.
Final Office Action issued in U.S. Appl. No. 15/750,881, dated Apr. 30, 2019.
Non-Final Office Action issued in U.S. Appl. No. 15/750,886, dated Mar. 21, 2019.
Non-Final Office Action issued in U.S. Appl. No. 15/750,871, dated Jun. 13, 2019.
Non-Final Office Action issued in U.S. Appl. No. 15/750,874, dated Dec. 13, 2018.
Non-Final Office Action issued in U.S. Appl. No. 15/750,871, dated Jan. 2, 2019.
Non-Final Office Action issued in U.S. Appl. No. 15/750,886, dated Aug. 8, 2019.

(56) References Cited

OTHER PUBLICATIONS

Non-Final Office Action issued in U.S. Appl. No. 15/754,208, dated Aug. 8, 2019.

* cited by examiner

FIG. 1
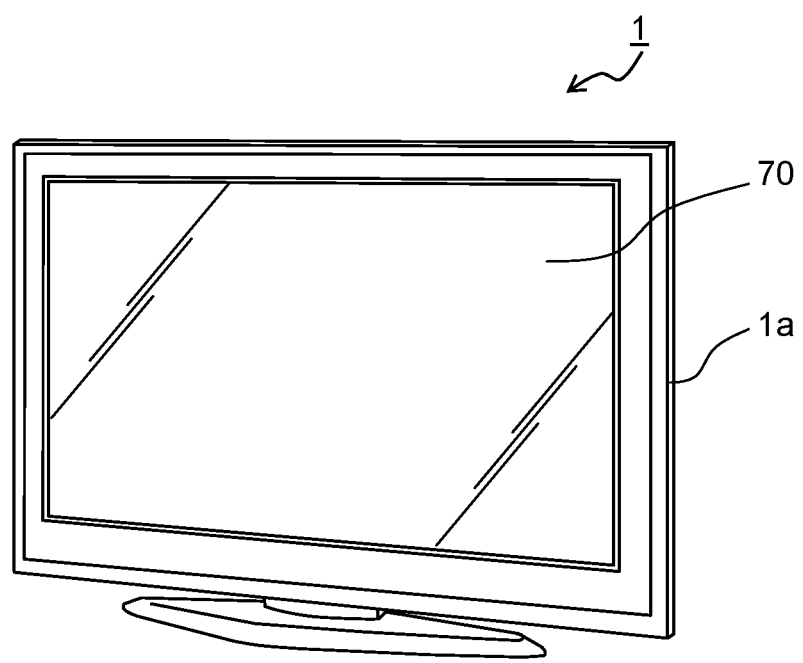
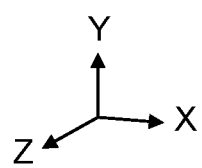

VIDEO DISPLAY DEVICE

This application is a U.S. national stage application of the PCT International Application No. PCT/JP2016/003939 filed on Aug. 30, 2016, which claims the benefit of foreign priority of Japanese patent applications No. 2015-172363 filed on Sep. 1, 2015 and No. 2016-047268 filed on Mar. 10, 2016, the contents all of which are incorporated herein by reference.

TECHNICAL FIELD

The present disclosure relates to a video display device including a backlight.

BACKGROUND ART

For example, various technologies for improving quality of images formed by a video display device including a backlight, such as a liquid crystal display device, have been developed. A technology called local dimming is one of examples of these technologies.

Patent Literature 1 discloses a technology relating to local dimming. Local dimming is a technology which divides a display panel into a plurality of areas, and dims each of a plurality of light sources disposed in corresponding one of the areas in accordance with brightness of an image formed in the corresponding area of the display panel. This technology can increase contrast of images within one screen. Each of the light sources is constituted by a light emitting element such as a light emitting diode (LED), for example.

CITATION LIST

Patent Literature

PTL 1: Unexamined Japanese Patent Publication No. 2014-41830

SUMMARY

According to the video display device performing local dimming, it is effective for accurate contrast enhancement within a screen to provide a larger number of light emitting elements capable of independently dimming for partial finer control of a backlight based on an image.

However, the video display device which independently dims numerous light emitting elements requires numerous substrates and cables corresponding to the numerous light emitting elements. This increase in the number of the substrates and cables may become an obstacle to reduction in size and thickness of the video display device, or may raise assembly cost of the video display device.

The present disclosure provides a video display device which includes a plurality of light emitting elements capable of independently dimming, and can achieve reduction in size, thickness, and assembly cost of the device.

A video display device according to an aspect of the present disclosure includes a display panel that displays an image based on an image signal, and a light source substrate disposed on a rear side of the display panel. The light source substrate includes a plurality of light emitting elements disposed on a surface of the light source substrate on a side toward the display panel, and a plurality of driver elements that are disposed on the same surface of the light source substrate as the surface to which the plurality of light emitting elements are attached, and drive each of the plurality of light emitting elements.

According to the video display device of the present disclosure, the plurality of light emitting elements and the plurality of driver elements are mounted on the same surface of the one light source substrate. Accordingly, reduction of substrates and cables, and reduction in size, thickness, and assembly cost of the device can be achieved.

BRIEF DESCRIPTION OF DRAWINGS

FIG. 1 is a view schematically illustrating an example of an external appearance of a video display device according to a first exemplary embodiment.

DESCRIPTION OF EMBODIMENTS

Figure 2:
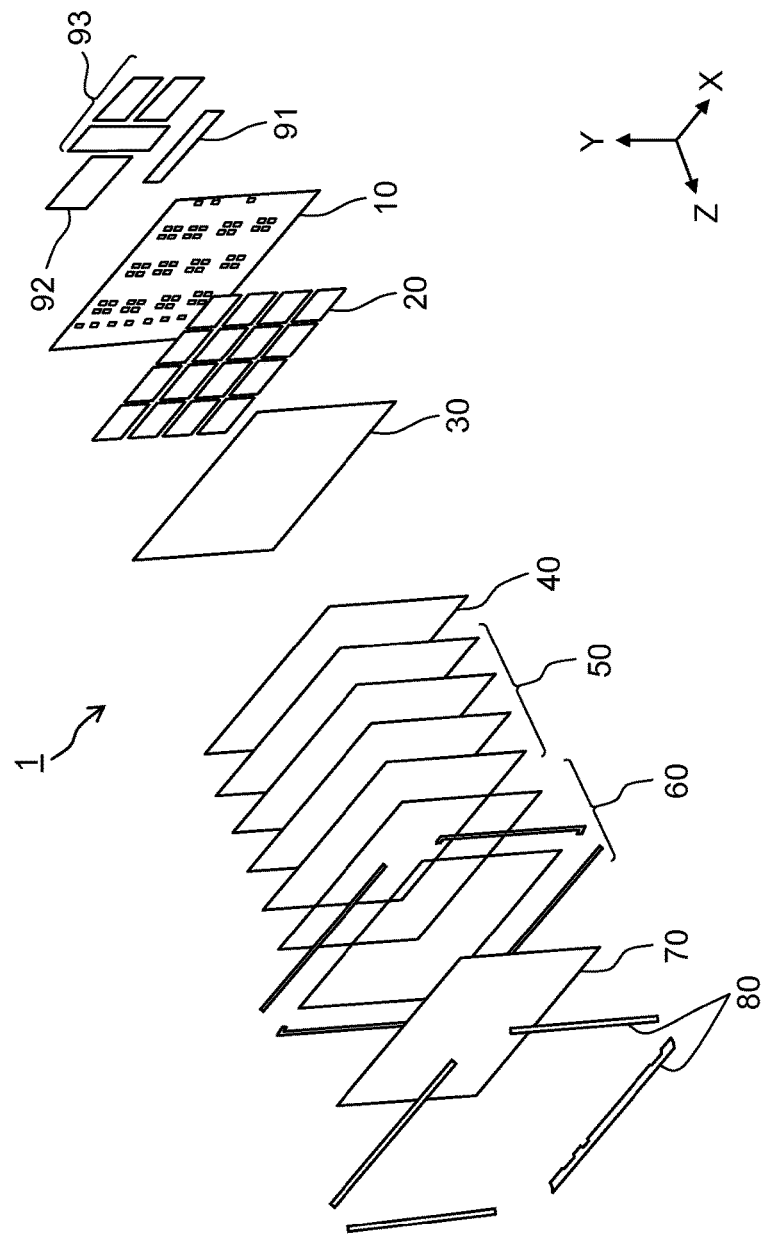
FIG. 2 is an exploded perspective view schematically illustrating an example of a configuration of the video display device according to the first exemplary embodiment.

A video display device according to exemplary embodiments described hereinafter includes a display panel, and a light source substrate to illuminate the display panel from the rear side. The light source substrate includes a plurality of light emitting elements each of which is provided in corresponding one of areas different from each other in the display panel, and further includes driver elements which drive (dim) each of the plurality of light emitting elements such that light is emitted with luminance corresponding to brightness of an image indicated by a control signal within the corresponding area.

According to this configuration, the plurality of light emitting elements and the plurality of driver elements are mounted on the one light source substrate. Accordingly, reduction of substrates and cables necessary for the video display device can be achieved, and thus reduction in size, thickness, and assembly cost of the device can be achieved. Each of the light emitting elements herein may be constituted by a light emitting diode (LED), for example.

The video display device may further include a reflection sheet disposed on the light source substrate, and provided with hollow protrusions for separating adjacent ones of the light emitting elements. The driver elements may be stored within the protrusions of the reflection sheet.

According to this configuration, the adjoining ones of areas are separated by the protrusions, wherefore mutual leakage of light between the areas illuminated by the adjacent ones of the light emitting elements decreases. This decrease in leakage of light can improve accuracy of brightness of the respective areas produced by the light emitting elements, thereby allowing illumination of the liquid crystal display panel with more accurate luminance. Moreover, non-uniformity of luminance caused by interference between the driver elements and the reflection sheet is prevented since the driver elements are stored within the hollow protrusions. Accordingly, the video display device effectively utilizes the spaces within the protrusions to mount the driver elements on the light source substrate.

In addition, the protrusion may be formed on each of the boundaries of the areas illuminated by the adjacent ones of the light emitting elements except for a part of the boundary. Support pins for supporting optical sheets may be attached to a base plate while penetrating portions not provided with the protrusions in the reflection sheet.

According to this configuration, the optical sheets can be supported at predetermined positions on the front surface side of the reflection sheet by the support pins. The support pins are provided on the boundaries of the areas illuminated by the light emitting elements. In this case, shadows of the support pins are less likely to appear within the areas, wherefore the presence of the support pins are less likely to cause lowering or non-uniformity of luminance within the areas. Furthermore, the support pins are provided substantially at central portions of the boundaries in regions relatively close to the light emitting elements and thus exhibiting relatively high brightness. In this case, lowering of luminance caused by the presence of the support pins becomes less noticeable than in such a case where the support pins are provided at ends of the boundaries in regions located relatively far from the light emitting elements and thus exhibiting relatively low brightness.

In addition, the light source substrate may include a plurality of connectors at positions different from each other to distribute signals or power.

In the light source substrate according to this configuration, connectors can be appropriately selected and used according to the positions of other members. For example, when one connector is unavailable to be used for other member, other connectors can be appropriately selected and used. In this case, the video display device is allowed to include a plurality of light source substrates having the same configuration even when available connectors for attachment of the plurality of light source substrates to the base plate are different for each attachment position, for example. As a result, cost reduction can be achieved by using common substrates.

In addition, the light source substrate may include input connectors to which at least either one of a signal and power is input, and output connectors from which at least either one of an input signal and input power is through-output. The video display device may include a plurality of the light source substrates. In this case, the output connectors of the first light source substrate and the input connectors of the second light source substrate may be connected to each other.

According to this configuration, reduction of cables necessary for connection can be achieved by electrically connecting the plurality of light source substrates with each other (cascade connection).

Exemplary embodiments are hereinafter described in detail with reference to the drawings as necessary. However, excessive details may be omitted in the following description. For example, detailed description of well-known matters, and repetitive description of substantially identical configurations may be omitted. This omission is made for avoiding excessive redundancy of the following description, and helping easy understanding by those skilled in the art.

Note that each of the exemplary embodiments described herein is only presented as a specific example of the present disclosure. Numerical values, shapes, materials, constituent elements, and positions and connection manners of the constituent elements included in the following exemplary embodiments are presented by way of example, and not intended to limit the subject matters of the present disclosure. In addition, constituent elements included in the following exemplary embodiments and not contained in the independent claims defining the highest concepts are described as optional constituent elements.

Note that the accompanying drawings and the following description are presented to help those skilled in the art fully understand the present disclosure. It is therefore not intended that the subject matters defined in the appended claims be limited to those drawings and description.

Moreover, the respective figures are schematic views and not necessarily precise depictions. Furthermore, substantially identical constituent elements in the respective figures have been given identical reference numbers. Description of these elements are omitted or simplified in some cases.

First Exemplary Embodiment

Video display device 1 according to a first exemplary embodiment is hereinafter described with reference to FIGS. 1 through 9. It is assumed that three axes of X axis, Y axis, and Z axis are defined in the respective figures in this exemplary embodiment. The X axis is an axis extending in a direction in parallel with a long side of a display panel. The Y axis is an axis extending in a direction in parallel with a short side of the display panel. The Z axis is an axis perpendicular to both the X and Y axes. However, these axes are defined only for convenience and not intended to limit the present disclosure.

[1-1. Configuration]

Video display device 1 according to the first exemplary embodiment includes a liquid crystal display panel, and light source substrates for illuminating the display panel from a rear side of the display panel. Video display device 1 is an example of a video display device. Mounted on each of the light source substrates are a plurality of light emitting elements each of which is provided in corresponding one of areas different from each other in the display panel, and driver elements for driving (dimming) the plurality of light emitting elements such that light is emitted from the light emitting elements with luminance corresponding to brightness indicated by a control signal (brightness of an image within the corresponding area). Note that brightness of an image within the corresponding area in this context refers to brightness of the image in the area of the display panel illuminated by one light emitting element (or light emitting element disposed in one portion) (i.e., partial brightness of the image in the area corresponding to the light emitting element).

FIG. 1 is a view schematically illustrating an example of an external appearance of video display device 1 according to the first exemplary embodiment.

As illustrated in FIG. 1, video display device 1 has an external appearance of an ordinary flat panel display, and includes display panel 70 and light source substrates (not shown in FIG. 1). Display panel 70 and the light source substrates are stored in housing 1a having an opened front surface. According to this exemplary embodiment, surfaces of video display device 1 and respective constituent members of video display device 1 facing a user (surface on the side illustrated in FIG. 1) are referred to as front surfaces, while surfaces on the side opposite to the front surfaces (back surfaces) are referred to as rear surfaces.

FIG. 2 is an exploded perspective view schematically illustrating an example of a configuration of video display device 1 according to the first exemplary embodiment.

As illustrated in FIG. 2, video display device 1 includes base plate 10, a plurality of light source substrates 20, reflection sheet 30, flatter 40, various types of optical sheets 50, mold frame 60, display panel 70, bezel 80, connection terminal substrate 91, signal processing substrate 92, and power supply substrate 93. These members are stored in housing 1a (see FIG. 1) to constitute video display device 1. Note that video display device 1 further includes a support member, a fastening member, a reinforcing member and the like not shown in the figures, besides the foregoing members.

Base plate 10 is a base to which light source substrates 20, connection terminal substrate 91, signal processing substrate 92, and power supply substrate 93 are attached. Base plate 10 is made of sheet metal, for example, but may be made of other materials. Screw holes, openings described below, and others are formed in base plate 10.

Light source substrates 20 constitute a backlight module illuminating display panel 70. Each of light source substrates 20 includes a plurality of light emitting elements, and a plurality of driver elements for driving each of the plurality of light emitting elements. These light emitting elements and driver elements are mounted on the same surface of light source substrates 20. The plurality of light source substrates 20 may have a uniform shape. Details of light source substrates 20 will be described below.

The plurality of light source substrates 20 included in video display device 1 are disposed in matrix within the same plane. Each of the plurality of light source substrates 20 is attached to a front surface of base plate 10 (surface on the side toward display panel 70). More specifically, each of light source substrates 20 is arranged on the front surface of base plate 10 in a first direction, and arranged in a second direction perpendicular to the first direction. According to video display device 1, the plurality of light source substrates 20 thus provided constitute a backlight to illuminate display panel 70.

Note that the first direction may be a direction in parallel with a long side of display panel 70, while the second direction may be a direction in parallel with a short side of display panel 70. The respective directions may be switched to the opposite directions.

Reflection sheet 30 is disposed on the front surfaces of light source substrates 20 (surfaces on the side toward display panel 70). Reflection sheet 30 includes openings through which light emitting elements (light emitting elements 21 of light source substrates 20 illustrated in FIG. 3) penetrate. Reflection sheet 30 is a sheet configured such that a part of light emitted from the light emitting elements and reflected on reflection sheet 30 travels toward display panel 70. Reflection sheet 30 is made of white synthetic resin, for example, but may be made of other white materials. Hollow protrusions having a protruding shape toward the front side (toward display panel 70) for separating the adjacent ones of the light emitting elements are formed in reflection sheet 30 (see FIG. 5). In this case, each periphery of the light emitting elements is surrounded by the corresponding protrusions, wherefore each of the light emitting elements illuminates an area surrounded by the corresponding protrusions around the light emitting element. Reflection sheet 30 will be detailed below.

Flatter 40 is an optical sheet disposed on the front surface of reflection sheet 30 (surface on the side toward display panel 70) to improve uniformity of luminance in each of the areas illuminated by the corresponding light emitting elements (areas surrounded by the protrusions of reflection sheet 30). Flatter 40 transmits light emitted from the light emitting elements not uniformly, but with distribution of light transmittance (hereinafter also abbreviated as "transmittance") produced in each of the areas illuminated by the light emitting elements. Note that distribution of transmittance in this exemplary embodiment refers to a state of a presence of distribution containing relatively high-transmittance portions and relatively low-transmittance portions. Flatter 40 is made of synthetic resin, for example, but may be made of other materials. When flatter 40 is absent, variations in luminance (luminance distribution) may be produced in each of the areas illuminated by the light emitting elements of light source substrates 20 in a state that each of the light emitting elements of light source substrates 20 is a point light source constituted by LEDs as described below. Flatter 40 is configured to produce transmittance distribution capable of canceling the luminance distribution in each area. Accordingly, uniformity of luminance in each of the areas illuminated by the light emitting elements can improve. Flatter 40 will be detailed below.

Optical sheets 50 are sheets having various types of optical functions other than the function of flatter 40. For example, optical sheets 50 include a diffusion plate which diffuses light to further increase uniformity of luminance, a prism sheet which equalizes traveling routes of light into a frontward direction to increase luminance visually recognized by the user, and others. For example, optical sheets 50 may be constituted by synthesis resin on which surface fine shapes corresponding to respective functions are formed.

Mold frame 60 is a support member which supports an outer periphery of display panel 70 from the rear surface. Mold frame 60 is made of synthetic resin, for example, but may be made of other materials. In addition, mold frame 60 may be fixed to base plate 10.

Display panel 70 is a liquid crystal display panel for image display, including a plurality of liquid crystal pixels arranged in matrix. Note that display panel 70 is capable of displaying not only videos, but also images (still images).

Bezel 80 is a support member which supports the outer periphery of display panel 70 from the front surface. Bezel 80 is made of metal, for example, but may be made of synthetic resin.

Connection terminal substrate 91 is a circuit substrate which includes terminals and an interface circuit for receiving image signals. Signal processing substrate 92 is a circuit substrate which includes a signal processing circuit for processing image signals. Signal processing substrate 92 further includes a circuit which generates control signals for controlling (dimming) luminance of the light emitting elements of light source substrates 20 based on image signals. Power supply substrate 93 is a circuit substrate which includes a power supply circuit for supplying operation power (hereinafter also abbreviated as "power") to video display device 1. Connection terminal substrate 91, signal processing substrate 92, and power supply substrate 93 are attached to the rear surface of base plate 10.

Light source substrates 20 are hereinafter described.

Figure 3:
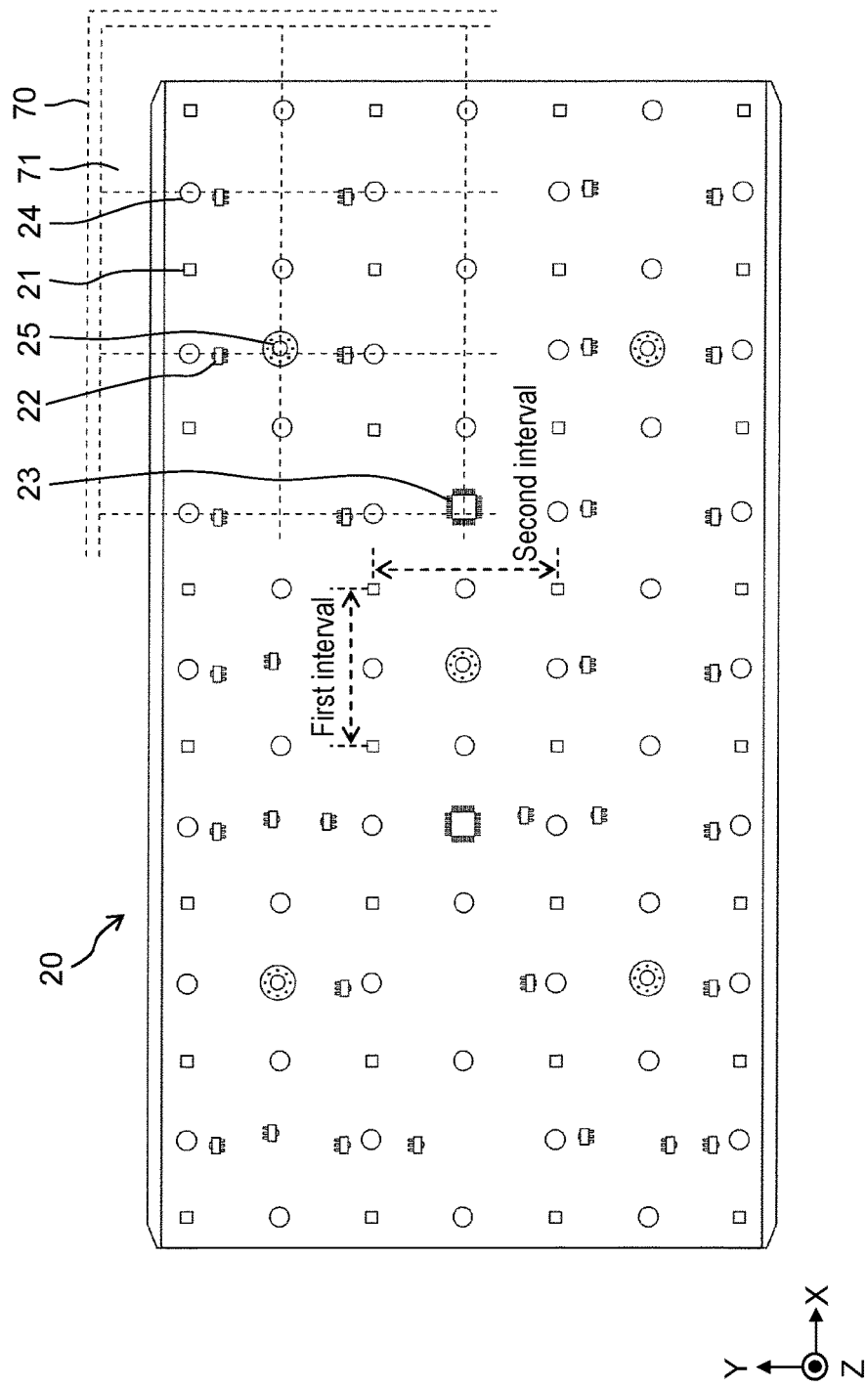
FIG. 3 is a plan view schematically illustrating an example of a configuration of a light source substrate included in the video display device according to the first exemplary embodiment.
Figure 4:
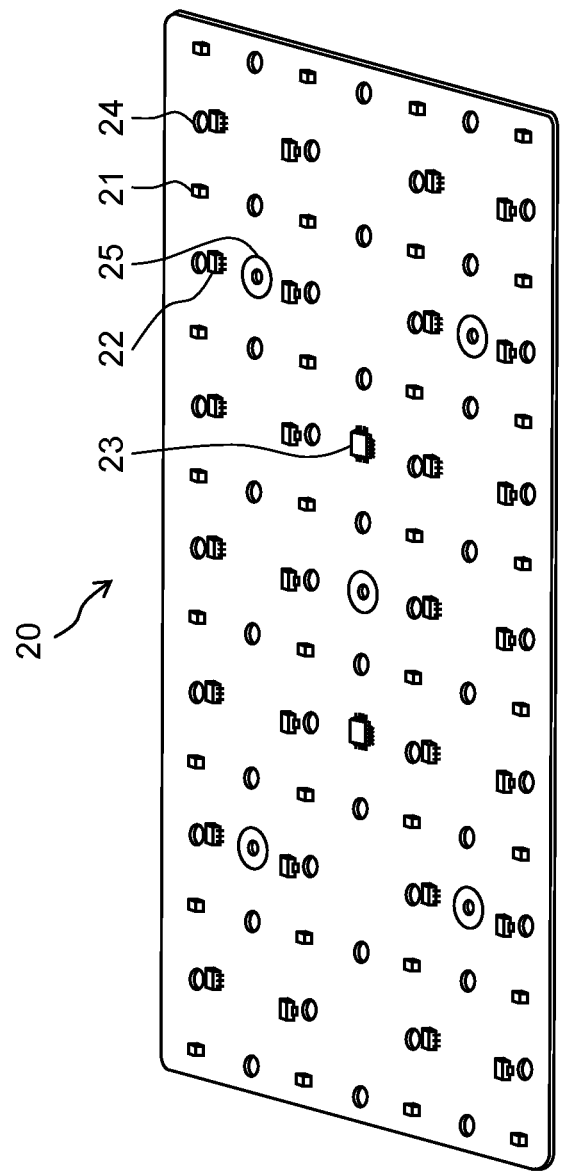
FIG. 4 is a perspective view schematically illustrating an example of a configuration of the light source substrate included in the video display device according to the first exemplary embodiment.

FIG. 3 is a plan view schematically illustrating an example of a configuration of each of light source substrates 20 included in video display device 1 according to the first exemplary embodiment. FIG. 4 is a perspective view schematically illustrating an example of a configuration of light source substrate 20 included in video display device 1 according to the first exemplary embodiment. Note that each of FIGS. 3 and 4 illustrates an example of respective members disposed on the front surface of light source substrate 20. In addition, positions corresponding to areas 71 of display panel 70 illuminated by respective light emitting elements 21 are indicated by broken lines in a part of FIG. 3 for facilitating visual understanding.

As illustrated in FIGS. 3 and 4, the plurality of light emitting elements 21 and a plurality of driver elements (first driver elements 23 and second driver elements 22) are mounted on the same surface of light source substrate 20 (front surface of light source substrate 20). Note that first driver elements 23 and second driver elements 22 are collectively referred to as driver elements in some cases in this exemplary embodiment.

Each of light emitting elements 21 is provided on corresponding one of areas 71 different from each other in display panel 70. According to video display device 1 of this exemplary embodiment, each of light emitting elements 21 is constituted by a high-voltage LED. The high-voltage LED in this context, for example, refers to an LED constituted by a plurality of LED elements (i.e., a plurality of pn junctions) connected in series. The high-voltage LED is an LED to which higher voltage is applicable than a single LED element (low-voltage LED). Moreover, when higher voltage is applied, the high-voltage LED can provide higher light emission luminance than a single LED element in a state of flow of substantially the same current. In this case, the high-voltage LED requires smaller current than the current flowing in the low-voltage LED to obtain the same light emission luminance by the high-voltage LED as the light emission luminance by the low-voltage LED. Accordingly, in case of electric connection of the plurality of light source substrates 20 (cascade connection) of video display device 1, heat generated by wiring or the like can be suppressed, wherefore a load imposed on a power source for supplying power to light source substrates 20 lowers.

As described above, light source substrate 20 can obtain higher light emission luminance while reducing a rise of driving current of the LEDs, thereby suppressing heat generated by first driver elements 23 and second driver elements 22. Accordingly, the LEDs as light emitting elements 21, and first driver elements 23 and second driver elements 22 are allowed to be mounted on the single substrate of light source substrate 20.

Note that the high-voltage LED in this context refers to an LED driven by driving voltage in a range from 10 (V) to 50 (V) inclusive, for example. According to video display device 1 of this exemplary embodiment, as the high-voltage LED, an LED driven at a voltage ranging from 20 (V) to 40 (V) inclusive may be used. On the other hand, the low-voltage LED is an LED driven at a voltage ranging from 3 (V) to 6 (V) inclusive, for example.

Light emitting elements 21 are disposed on a surface (front surface) of light source substrate 20 in a state of substantially uniform dispersion. Accordingly, light emitting elements 21 are disposed substantially at uniform positions throughout a display area of display panel 70 in a state that light source substrates 20 are disposed in matrix.

According to video display device 1 of this exemplary embodiment, areas 71 are rectangular ranges corresponding to substantially equal parts divided by boundaries vertically and horizontally perpendicular to each other in the display area of display panel 70. According to this exemplary embodiment, it is assumed that the direction in parallel with the long side of display panel 70 corresponds to the horizontal direction, while the direction in parallel with the short side of display panel 70 corresponds to the vertical direction. In addition, respective light emitting elements 21 are arranged in matrix on light source substrate 20 such that each of light emitting elements 21 is disposed at a position corresponding to a center of corresponding area 71. More specifically, respective light emitting elements 21 are arranged on light source substrate 20 at first intervals in the first direction, and at second intervals in the second direction perpendicular to the first direction. Accordingly, each of the first intervals has substantially the same length as the length of the side of each of areas 71 in parallel with the first direction, while each of the second intervals has substantially the same length as the length of the side of each of areas 71 in parallel with the second direction. Note that the first direction corresponds to the horizontal direction in FIG. 3, for example, while the second direction corresponds to the vertical direction in FIG. 3, for example. In addition, the first direction may be a direction in parallel with one side (such as long side) of the display area of display panel 70, while the second direction may be a direction in parallel with another side (such as short side) of the display area of display panel 70. The respective directions may be switched to the opposite directions.

Each of first driver elements 23 and second driver elements 22 is a semiconductor element for driving light emitting elements 21 based on a control signal supplied from signal processing substrate 92. A control signal indicating brightness of an image in area 71 associated with each of light emitting elements 21 is supplied from signal processing substrate 92 to first driver element 23 and second driver element 22. In this case, first driver element 23 and second driver element 22 drive (dim) each of light emitting elements 21 such that light is emitted with luminance corresponding to the brightness indicated by the control signal. Each of first driver elements 23 and second driver elements 22 may be constituted by a metal-oxide semiconductor (MOS) transistor, or a semiconductor integrated circuit (IC), for example.

As described above, video display device 1 of this exemplary embodiment includes first driver elements 23 and second driver elements 22 as driver elements. Note that each of second driver elements 22 may be constituted by a transistor which dims each of light emitting elements 21. Each of first driver elements 23 may be constituted by an integrated circuit which generates a gate signal of second driver element 22 based on a control signal supplied from signal processing substrate 92. The two types of driver elements are mounted on the surface of light source substrate 20 on the side where light emitting elements 21 are attached. Accordingly, wiring becomes simple even when a number of light emitting elements 21 are attached to light source substrate 20. Moreover, electric connection between the plurality of light source substrates 20 (cascade connection) can be easily realized.

Each of first driver elements 23 and second driver elements 22 is disposed between adjacent ones of light emitting elements 21. More specifically, each of first driver elements 23 and second driver elements 22 is disposed at least within either one of the first interval and the second interval, particularly near a middle point of at least either one of the first interval and the second interval.

According to light source substrate 20 of this exemplary embodiment, each of first driver elements 23 is disposed at the middle point of the first interval and the second interval, i.e., a crossing portion. Each of second driver elements 22 is disposed near the middle point of the first interval. More specifically, as illustrated in an example of FIG. 3, each of first driver elements 23 is disposed in the vicinity of a crossing point (crossing portion) of a line extending in the second direction from the middle point of adjacent ones of light emitting elements 21 in the first direction, and a line extending in the first direction from the middle point of adjacent ones of light emitting elements 21 in the second direction. Each of the second driver elements 22 is disposed in the vicinity of the middle point of adjacent ones of light emitting elements 21 in the first direction.

Figure 5:
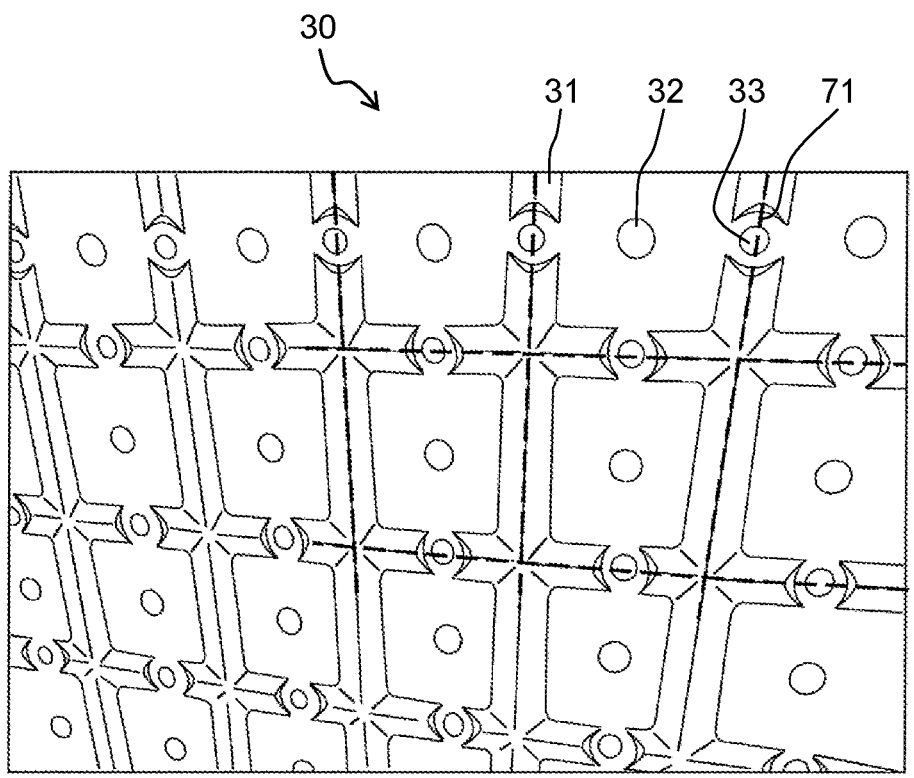
FIG. 5 is a perspective view schematically illustrating an example of a shape of a reflection sheet included in the video display device according to the first exemplary embodiment.

According to video display device 1 of this exemplary embodiment, first driver elements 23 and second driver elements 22 are disposed on the rear side of hollow protrusions illustrated in FIG. 5 (inside spaces formed by protrusions). Accordingly, the position of the foregoing vicinity refers to a range falling within the inside space of each protrusion.

In light source substrate 20, openings 24 which receive support pins for supporting flatter 40 to stand the support pins thereon, and screw holes 25 which receive screws fastened to fix light source substrate 20 to base plate 10 are formed.

According to light source substrate 20, first driver elements 23, second driver elements 22, openings 24, and screw holes 25 are disposed on boundaries of adjoining ones of areas 71. Advantageous effects offered from this layout will be described below.

Reflection sheet 30 is hereinafter described.

FIG. 5 is a perspective view schematically illustrating an example of a shape of reflection sheet 30 included in video display device 1 according to the first exemplary embodiment. Positions corresponding to areas 71 are indicated by broken lines in a part of FIG. 5 for facilitating visual understanding.

As illustrated in FIG. 5, protrusions 31, openings 32, and openings 33 are formed in reflection sheet 30.

Openings 32 are provided at positions corresponding to light emitting elements 21 of light source substrate 20 disposed on the rear side of reflection sheet 30. Light emitting elements 21 are exposed from the rear surface of reflection sheet 30 through openings 32 front surface of reflection sheet 30.

Reflection sheet 30 is made of white synthetic resin to reflect light emitted from light emitting elements 21. In this case, light emitting elements 21 emit light which penetrates openings 32 and is exposed to reflection sheet 30. A part of the light (such as light traveling rearward) is reflected on reflection sheet 30 and travels toward the front direction (toward display panel 70).

Protrusions 31 are hollow, and formed at positions separating adjacent ones of openings 32 (i.e., adjacent ones of light emitting elements 21). Each of protrusions 31 has a shape protruding toward the front side (toward display panel 70). More specifically, each of protrusions 31 is formed on the boundary of areas 71 illuminated by corresponding adjacent ones of light emitting elements 21 (adjoining ones of areas 71) except for a part of the boundaries.

Each of openings 33 is formed in reflection sheet 30 at the portion not provided with protrusion 31 on the boundary of corresponding adjoining ones of areas 71. Each of the support pins penetrates opening 33, and opening 24 of light source substrate 20 to be fixed to base plate 10.

Flatter 40 is hereinafter described.

Figure 6:
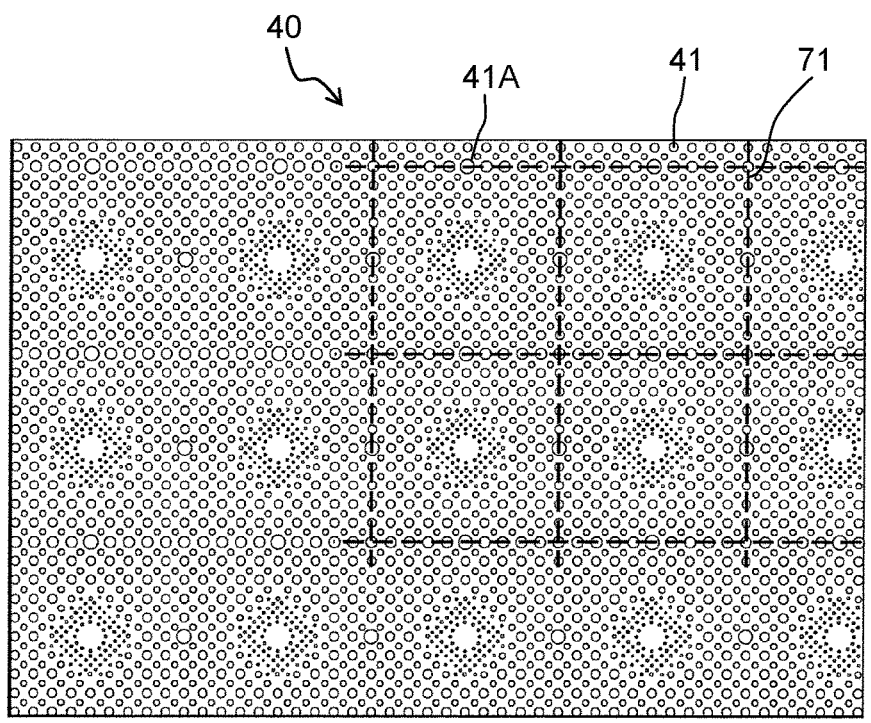
FIG. 6 is a plan view schematically illustrating an example of a shape of a flatter included in the video display device according to the first exemplary embodiment.

FIG. 6 is a plan view schematically illustrating an example of a shape of flatter 40 included in video display device 1 according to the first exemplary embodiment. Positions corresponding to areas 71 are indicated by broken lines in a part of FIG. 6 for facilitating visual understanding.

As illustrated in FIG. 6, holes 41 in various sizes are formed in a sheet of flatter 40 made of synthetic resin. Flatter 40 controls transmittance of light by using holes 41. More specifically, flatter 40 has distribution of transmittance within areas 71 in accordance with a layout (size, position, number) of holes 41. Distribution of transmittance of flatter 40 is so designed as to cancel luminance distribution (luminance variations) which may be produced by light emitting elements 21 within areas 71 when flatter 40 is absent. This configuration of flatter 40 can improve uniformity of luminance within areas 71.

Attachment of reflection sheet 30 to light source substrate 20, and a layout of respective members are hereinafter described.

Figure 7:
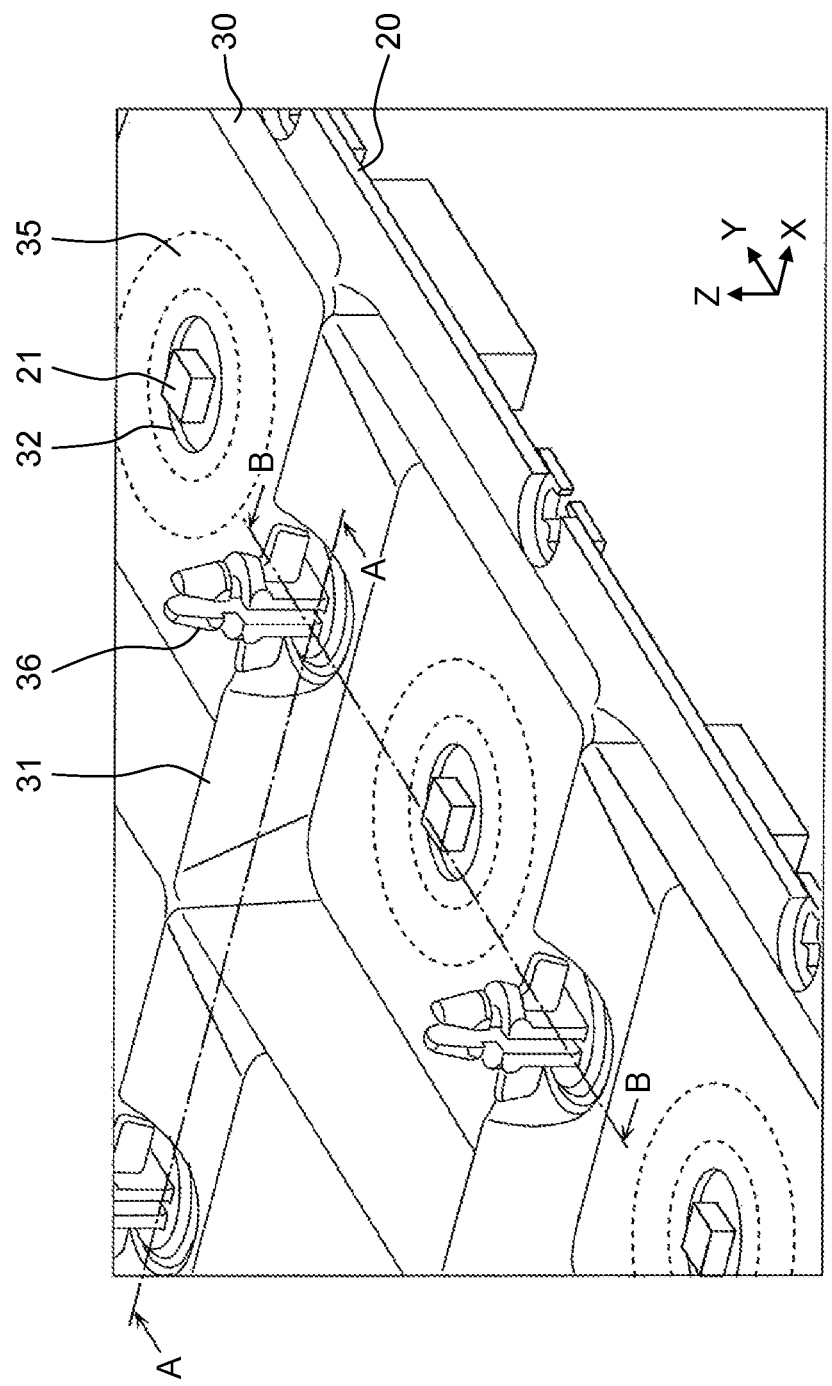
FIG. 7 is a perspective view schematically illustrating an example of attachment of the reflection sheet to the light source substrate in the video display device according to the first exemplary embodiment.

FIG. 7 is a perspective view schematically illustrating an attachment example of reflection sheet 30 to light source substrate 20 according to video display device 1 of the first exemplary embodiment.

Figure 8:
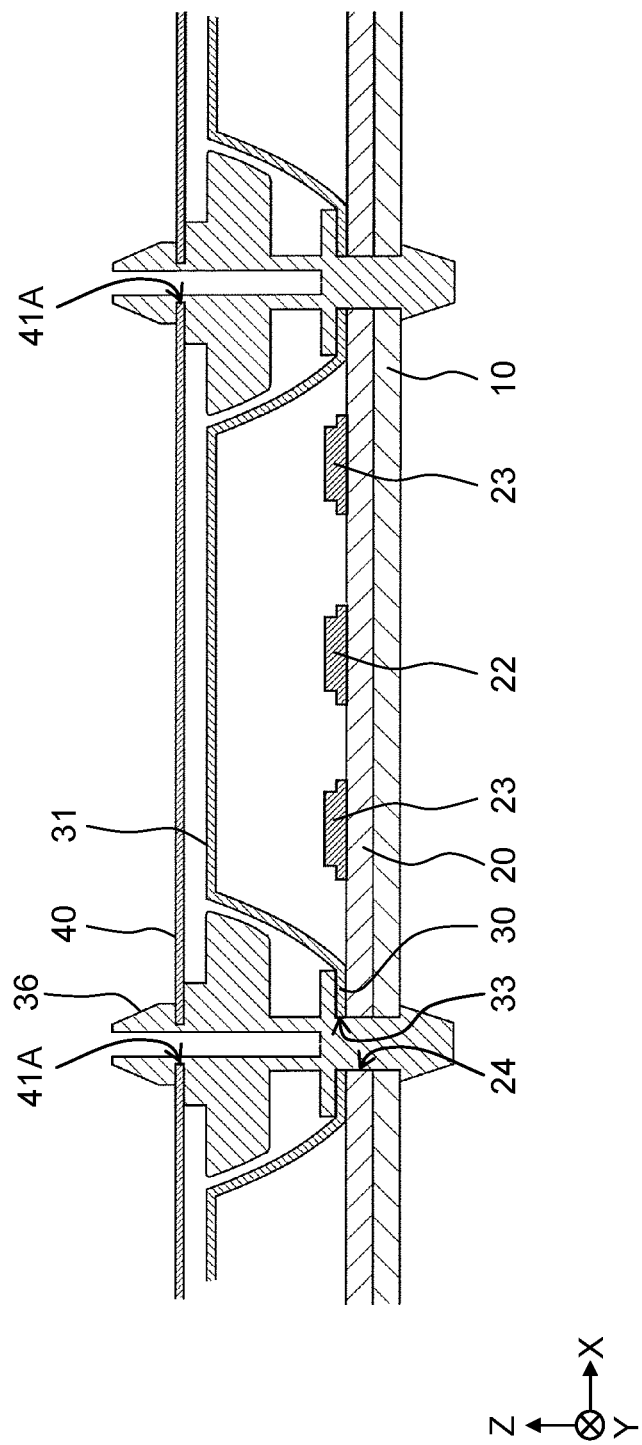
FIG. 8 is a cross-sectional view schematically illustrating an example of a layout of members including the light source substrate, the reflection sheet, and the flatter in the video display device according to the first exemplary embodiment.
Figure 9:
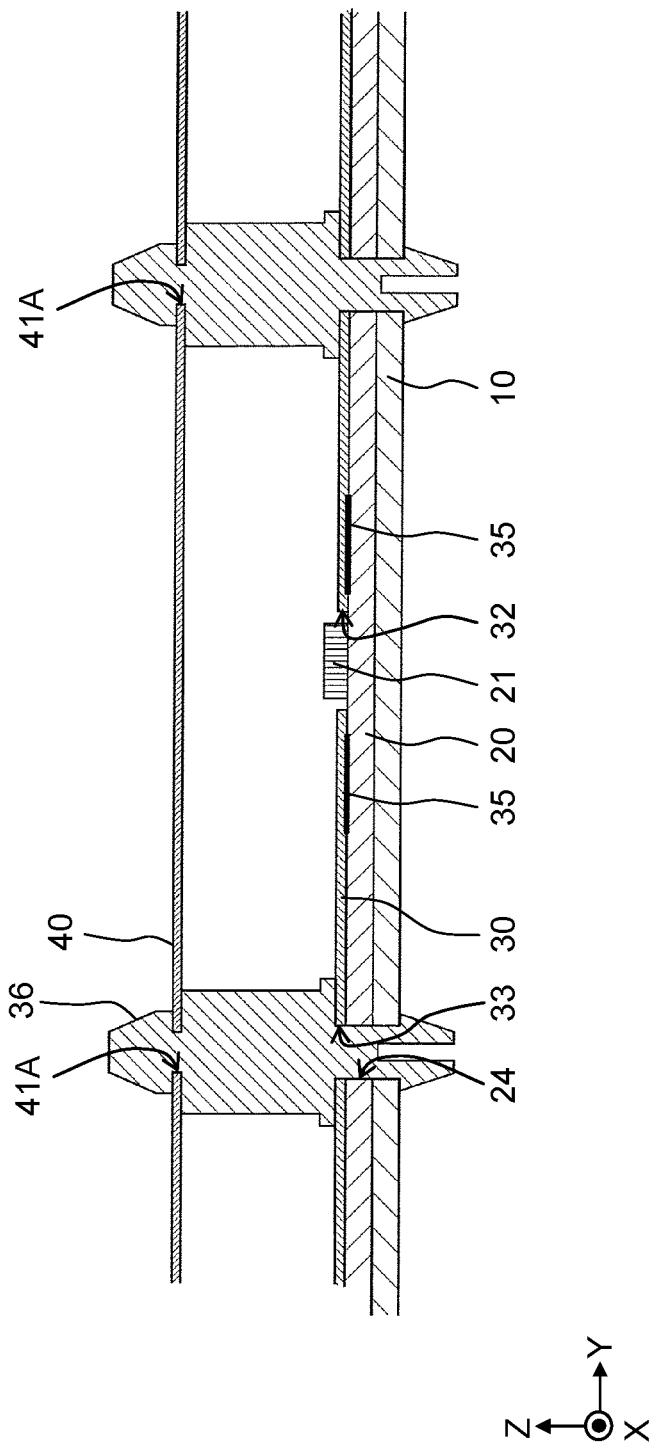
FIG. 9 is a cross-sectional view schematically illustrating an example of a layout of members including the light source substrate, the reflection sheet, and the flatter in the video display device according to the first exemplary embodiment.

FIGS. 8 and 9 are cross-sectional views schematically illustrating an example of a layout of members including light source substrate 20, reflection sheet 30, and flatter 40 in video display device 1 of the first exemplary embodiment. FIG. 8 illustrates a cross-sectional view taken along a line A-A in FIG. 7, while FIG. 9 illustrates a cross-sectional view taken along a line B-B in FIG. 7. FIG. 7 does not show flatter 40, while FIGS. 8 and 9 show flatter 40.

As illustrated in FIGS. 7, 8, and 9, reflection sheet 30 is affixed to light source substrate 20 via adhesive tapes 35 at flat portions of reflection sheet 30 around openings 32, and also fixed to light source substrate 20 via support pins 36 penetrating openings 24 and openings 33 and attached to base plate 10. Reflection sheet 30 is joined to light source substrate 20 in this manner.

Light emitting elements 21 of light source substrate 20 penetrate from the rear surface of reflection sheet 30 through openings 32 to be exposed to the front surface of reflection sheet 30. First driver elements 23 and second driver elements 22 of light source substrate 20 are stored in spaces formed inside protrusions 31 (spaces formed by the presence of protrusions 31 between the rear surface of reflection sheet 30 and the front surface of light source substrate 20).

While not shown in FIGS. 7 through 9, light source substrate 20 is fixed to base plate 10 via screws passing through screw holes 25 (see FIG. 3) and attached to base plate 10. In this case, heads of the screws are also stored in the spaces of protrusions 31.

Flatter 40 is disposed on the front side of reflection sheet 30 while supported by support pins 36. More specifically, flatter 40 is supported by support pins 36 in a state that specific holes 41A of flatter 40 are embedded into notches formed in upper portions of support pins 36. Note that, in FIGS. 8 and 9, a plurality of holes 41 (see FIG. 6) formed in flatter 40 are omitted.

Light source substrate 20, reflection sheet 30, and flatter 40 are joined to each other into one structure body in the foregoing manner. As shown in FIG. 2, provided thereafter are various types of optical sheets 50 on the front side of the structure body, and display panel 70 on the front side of optical sheets 50 to constitute video display device 1. According to video display device 1, display panel 70 is illuminated from the rear side with more uniform light emitted from light emitting elements 21 of light source substrate 20 and passing through flatter 40 and the plurality of optical sheets 50. In this case, brightness of the light illuminating display panel 70 from the rear side is controlled (dimmed) for each area 71 in accordance with images. Accordingly, images having more accurate contrast are displayed on display panel 70.

[1-2. Effects and Others]

According to this exemplary embodiment, as described above, a video display device includes a display panel that displays an image based on an image signal, and a light source substrate disposed on a rear side of the display panel. The light source substrate includes a plurality of light emitting elements disposed on a surface of the light source substrate on a side toward the display panel, and a plurality of driver elements that are disposed on the same surface of the light source substrate as the surface to which the plurality of light emitting elements are attached, and drive each of the plurality of light emitting elements.

Note that video display device 1 is an example of the video display device. Display panel 70 is an example of the display panel. Light source substrate 20 is an example of the light source substrate. Light emitting elements 21 are an example of the light emitting elements. Each of first driver elements 23 and second driver elements 22 is an example of the driver elements.

For example, according to the example discussed in the first exemplary embodiment, video display device 1 includes display panel 70 that displays an image based on an image signal, and light source substrate 20 disposed on a rear side of display panel 70. Light source substrate 20 includes a plurality of light emitting elements 21 disposed on the surface of light source substrate 20 on the side toward the display panel 70, and first driver elements 23 and second driver elements 22 that are disposed on the same surface of light source substrate 20 as the surface to which light emitting elements 21 are attached, and drive each of the plurality of light emitting elements 21.

According to the video display device, each of the plurality of light emitting elements may be disposed at a position of the light source substrate in correspondence with a corresponding one of areas different from each other in the display panel. Each of the plurality of driver elements may dim, in accordance with brightness of an image displayed in the corresponding one of the areas, each of the plurality of light emitting elements disposed at the position of the light source substrate in correspondence with the corresponding one of the areas.

According to the video display device, the plurality of light emitting elements may be arranged at first intervals in a first direction, and arranged at second intervals in a second direction perpendicular to the first direction. Each of the plurality of driver elements may be disposed at a middle point of each first interval and each second interval, or near the middle point.

Note that the direction in parallel with the long side of display panel 70 is an example of the first direction. The direction in parallel with the short side of display panel 70 is an example of the second direction. The length of either one of the one side (such as side in parallel with the first direction) and the other side (such as side in parallel with the second direction) of each of the plurality of rectangular areas 71 defined in display panel 70 is an example of the first interval, while the length of the other is an example of the second interval.

Each of the plurality of light emitting elements may be a light emitting diode (high-voltage LED) constituted by a plurality of LED elements connected in series. In this case, each of the light emitting elements may be driven at a driving voltage selected in a range from 10 (V) to 50 (V) inclusive.

Video display device 1 having this configuration can offer following advantageous effects.

Initially, video display device 1 is suited for an aim of reducing size, thickness, and assembly cost.

Assumed herein for comparison with video display device 1 is a video display device which includes several hundreds or more light emitting elements, and a backlight capable of independently controlling the plurality of light emitting elements similarly to video display device 1. According to this video display device, a substrate on which the plurality of light emitting elements are mounted, and a substrate on which driver elements are mounted are provided separately from each other. The respective substrates are connected to each other via cables to independently control each luminance of the plurality of light emitting elements. In case of the video display device having this configuration, however, numerous substrates and cables are required. In this case, reduction in size and thickness of the video display device becomes difficult. In addition, assembly cost of the video display device may increase.

According to video display device 1 presented in this exemplary embodiment, the plurality of light emitting elements 21, and the plurality of first driver elements 23 and second driver elements 22 are mounted on one light source substrate 20. In this case, reduction of substrates and cables can be realized, and therefore reduction in size, thickness, and assembly cost of video display device 1 can be achieved.

According to video display device 1, a high-voltage LED constituted by including a plurality of LED elements connected in series may be used as each of light emitting elements 21. When the high-voltage LED is used, the driving voltage of light emitting elements 21 of light source substrate 20 can be raised in comparison with use of an LED other than the high-voltage LED (low-voltage LED). In this case, light source substrate 20 can obtain higher light emission luminance while suppressing a rise of driving current. Accordingly, heat generated from the driver elements can be suppressed.

There is a case where LEDs and driver elements are difficult to be mounted on one substrate for a reason of difficulty in design for heat radiation or other reasons. However, video display device 1 which includes the high-voltage LED constituting light emitting elements 21 allows mounting of the plurality of light emitting elements 21 and the plurality of first driver elements 23 and second driver elements 22 on one light source substrate 20.

In addition, according to video display device 1, hollow protrusions 31 are formed on reflection sheet 30 to separate adjacent ones of light emitting elements 21. First driver elements 23 and second driver elements 22 are stored within protrusions 31.

When unnecessary wrinkles, bulges or the like are produced on reflection sheet 30 by the presence of the driver elements or the like, luminance non-uniformity may be caused within areas 71. According to video display device 1, however, first driver elements 23 and second driver elements 22 are stored in the spaces formed by protrusions 31 on the rear side of reflection sheet 30. In this case, luminance non-uniformity caused by interference between the driver elements and reflection sheet 30 can be prevented. Accordingly, in video display device 1, by effectively utilizing the spaces within protrusions 31, it can be achieved to mount first driver elements 23 and second driver elements 22 on light source substrate 20.

In addition, according to video display device 1, adjoining ones of areas 71 are separated by protrusions 31. In this case, mutual light leakage between areas 71 illuminated by adjacent ones of light emitting elements 21 decreases. In this case, accuracy of brightness produced by light emitting elements 21 in respective areas 71 further improves, wherefore luminance of light illuminating display panel 70 becomes more accurate.

In addition, according to video display device 1, protrusions 31 are formed on the boundaries of areas 71 illuminated by adjacent ones of light emitting elements 21 except for a part of the boundary. Support pins 36 for supporting flatter 40 are attached to base plate 10 while penetrating portions not provided with protrusions 31 in reflection sheet 30. In this case, shadows of support pins 36 are less likely to appear within areas 71, wherefore it can be suppressed that the presence of support pins 36 becomes the cause of lowering of luminance within areas 71.

In addition, central portions of the boundaries of adjoining ones of areas 71 are relatively close to light emitting elements 21, and therefore exhibit relatively high brightness. According to video display device 1, support pins 36 are provided in the central portions (substantially central portions). In this case, lowering of luminance caused by the presence of support pins 36 becomes less noticeable than in such a case when support pins 36 are provided at ends of the boundaries in regions relatively far from light emitting elements 21 and thus exhibiting relatively low brightness.

According to the video display device including the plurality of light emitting elements capable of independently dimming in the exemplary embodiment described above, reduction in size, thickness, and assembly cost of the video display device can be achieved.

Second Exemplary Embodiment

A second exemplary embodiment is hereinafter described with reference to FIGS. 10 and 11.

Video display device 1 (not shown) presented according to the second exemplary embodiment is substantially similar to video display device 1 presented in the first exemplary embodiment, except for that a configuration not disclosed in the first exemplary embodiment is added. The configuration not disclosed in the first exemplary embodiment is chiefly discussed hereinbelow, with appropriate omission of the matters already described in the first exemplary embodiment.

[2-1. Configuration]

Disclosed in the second exemplary embodiment is video display device 1 which includes light source substrate 20 configured to make electric connection with other substrates via cables. According to the second exemplary embodiment, light source substrate 20 has a configuration for cable connection via connectors appropriately selected, in addition to the configuration of video display device 1 of the first exemplary embodiment.

In the following description, constituent elements substantially similar to the constituent elements included in video display device 1 according to the first exemplary embodiment have been given reference numbers similar to the reference numbers of the constituent elements of the first exemplary embodiment. The description of these constituent elements is omitted.

A plurality of connectors for connection with cables are provided on the rear surface of light source substrate 20. These connectors are used to distribute signals and power between a plurality of light source substrates 20 via cables. This distribution will be described below.

Figure 10:
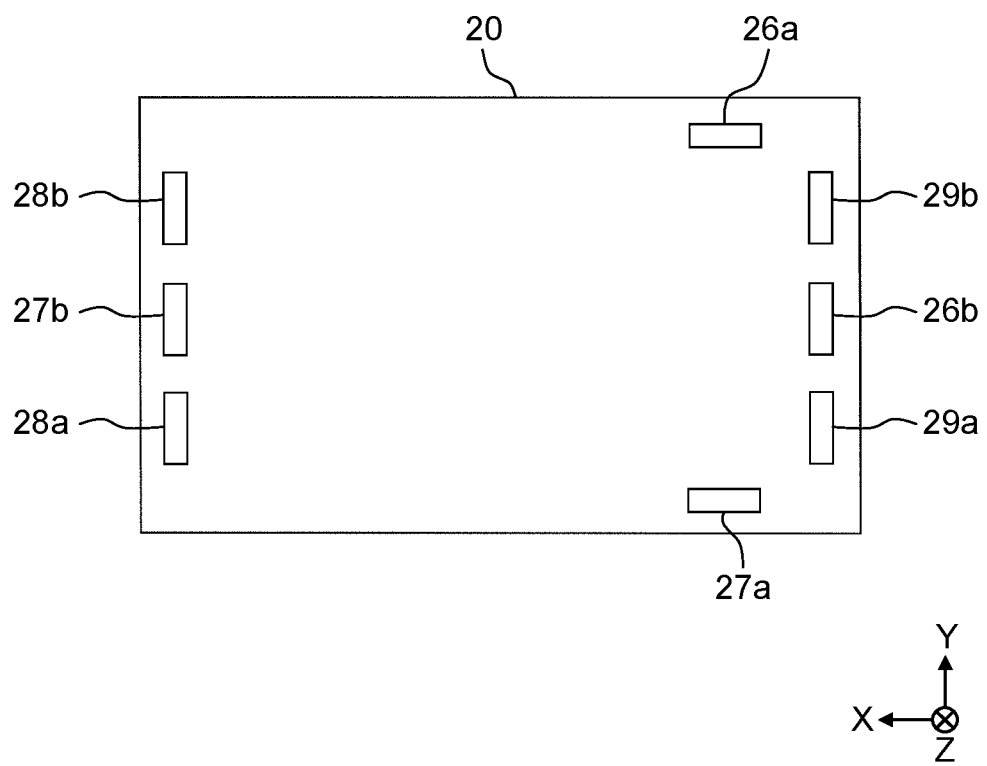
FIG. 10 is a plan view schematically illustrating an example of a layout of connectors on the light source substrate in a video display device according to a second exemplary embodiment.

FIG. 10 is a plan view schematically illustrating an example of a layout of connectors provided on light source substrate 20 of video display device 1 according to the second exemplary embodiment. Note that FIG. 10 illustrates a plan view of light source substrate 20 on the rear side.

As illustrated in FIG. 10, light source substrate 20 includes signal input connector 26a, signal input connector 26b, signal output connector 27a, signal output connector 27b, power input connector 28a, power input connector 28b, power output connector 29a, and power output connector 29b. These connectors are disposed at different positions of the rear surface of light source substrate 20.

Light source substrate 20 includes wiring (not shown) configured such that a control signal input from signal processing substrate 92 or different light source substrate 20 to signal input connector 26a or signal input connector 26b is distributed to driver elements mounted on light source substrate 20, and output from both signal output connector 27a and signal output connector 27b (hereinafter also referred to as "through-output").

Accordingly, when a control signal is input from signal processing substrate 92 or different light source substrate 20 to either one of signal input connector 26a and signal input connector 26b, this control signal is through-output from both signal output connector 27a and signal output connector 27b of light source substrate 20. Note that the control signal is a signal indicating brightness of images in respective areas 71 corresponding to respective light emitting elements 21. According to light source substrate 20, each of the plurality of light emitting elements 21 is driven (dimmed) by corresponding first driver element 23 and second driver element 22 such that light is emitted with luminance corresponding to brightness indicated by the control signal (brightness of an image within the corresponding area).

In addition, light source substrate 20 includes wiring (not shown) configured such that power input from power supply substrate 93 or different light source substrate 20 to power input connector 28a or power input connector 28b is distributed to respective elements mounted on light source substrate 20, and through-output from power output connector 29a and power output connector 29b.

Accordingly, when power is input from power supply substrate 93 or different light source substrate 20 to either one of power input connector 28a and power input connector 28b, this power is through-output from both power output connector 29a and power output connector 29b of light source substrate 20. Each of the plurality of light emitting elements 21 of light source substrates 20 is driven by the power thus output.

As described above, light source substrate 20 according to the second exemplary embodiment includes a plurality of connectors at different positions to distribute signals or power. Accordingly, in case of light source substrate 20 included in video display device 1 of the second exemplary embodiment, for example, connectors can be appropriately selected and used according to the positions of other members. For example, when one connector is unavailable to be used for other member, other connectors can be appropriately selected and used. In this case, video display device 1 of this exemplary embodiment is allowed to include a plurality of light source substrates 20 having the same configuration when the plurality of light source substrates 20 are attached to base plate 10, even when available connectors are different according to the attachment position, for example. As a result, cost reduction can be achieved by using the plurality of light source substrates 20 having the same configuration (i.e., by using common substrates) according to video display device 1 of the second exemplary embodiment.

This configuration shown in the second exemplary embodiment is suitable for a backlight constituted by the plurality of light source substrates 20 electrically connected to each other (cascade connection), for example.

Figure 11:
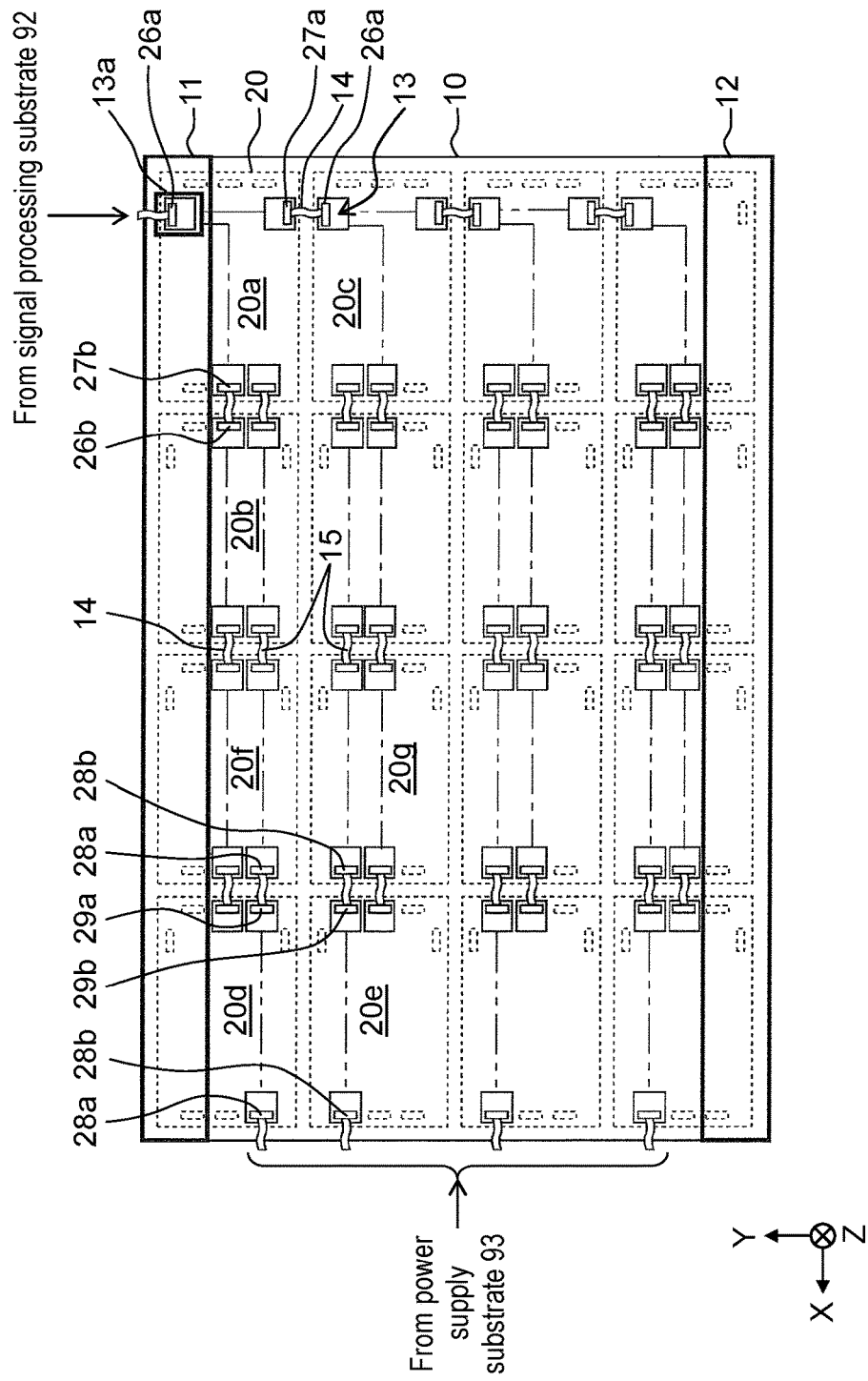
FIG. 11 is a plan view schematically illustrating an example of connection of a plurality of the light source substrates constituting a backlight in the video display device according to the second exemplary embodiment.

FIG. 11 is a plan view schematically illustrating an example of connection of the plurality of light source substrates 20 constituting a backlight of video display device 1 according to the second exemplary embodiment.

The plan view shown in FIG. 11 illustrates the rear side of base plate 10 to which 16 light source substrates 20 are attached by way of example. Light source substrates 20 are attached to the front surface of base plate 10, wherefore attachment positions of light source substrates 20 are indicated by broken lines in FIG. 11. Note that the number of light source substrates 20 attached to base plate 10 is not limited to 16.

As indicated by the broken lines in FIG. 11, the plurality of light source substrates 20 included in video display device 1 are arranged in matrix on base plate 10. More specifically, respective light source substrates 20 are disposed in the first direction, and in the second direction perpendicular to the first direction on base plate 10. In this case, the plurality of light source substrates 20 arranged in matrix on base plate 10 are electrically connected to each other (cascade connection) via cables 14 or cables 15 as illustrated in FIG. 11. In other words, at least either light source substrates 20 arranged in the first direction, and light source substrates 20 arranged in the second direction are connected by cascade connection.

Note that the first direction may be a direction in parallel with one side (such as long side) of base plate 10, and that the second direction may be a direction in parallel with another side (such as short side) of base plate 10. The respective directions may be switched to the opposite directions.

As illustrated in FIG. 11, reinforcing beam 11 is provided at an upper end of the rear surface of base plate 10, while reinforcing beam 12 is provided at a lower end of the rear surface of base plate 10. A plurality of openings 13 are formed in base plate 10 to allow electric connection between predetermined connectors of light source substrate 20 and other substrates (signal processing substrate 92, power supply substrate 93, or different light source substrate 20) via cables. In addition, reinforcing beam 11 includes opening 13a provided substantially at the same position as the position of predetermined one of the plurality of openings 13 formed in base plate 10 to allow electric connection between a predetermined connector (such as signal input connector 26a) of one light source substrate 20 (such as light source substrate 20a) and another substrate (such as signal processing substrate 92) via a cable. In this case, respective connectors provided on the rear surfaces of respective light source substrates 20 are exposed to the rear side of base plate 10 through openings 13 formed in base plate 10, or both opening 13 and opening 13a formed in reinforcing beam 11. Accordingly, connectors of respective light source substrates 20 can be electrically connected with each other via cables 14 or cables 15 passing through the rear side of base plate 10.

According to video display device 1 of the second exemplary embodiment, 16 light source substrates 20 are electrically connected with each other via cables 14 and cables 15 to constitute a backlight. Note that seven light source substrates 20 in upper two rows are given reference numbers 20a through 20g in FIG. 11 to simplify the description.

More specifically, as illustrated in FIG. 11, signal output connector 27b of each of light source substrates 20 is electrically connected to signal input connector 26b of neighboring light source substrate 20 on the left side in the figure via cable 14. However, signal output connector 27a of each of four light source substrates 20 at the right end in the figure is electrically connected to signal input connector 26a of light source substrate 20 disposed immediately below in the figure via cable 14. In addition, signal input connector 26a of light source substrate 20a at the right upper end in the figure is electrically connected to signal processing substrate 92 via a cable.

In this case, a control signal supplied from signal processing substrate 92 is input to signal input connector 26a of light source substrate 20a. This control signal is through-output from signal output connector 27a and signal output connector 27b of light source substrate 20a, and input to each of signal input connector 26a of light source substrate 20c and signal input connector 26b of light source substrate 20b via cables 14. Thereafter, the control signal is distributed from one light source substrate 20 to other light source substrates 20 via cables 14 based on the foregoing configuration. Similar distribution is repeated to distribute the control signal supplied from signal processing substrate 92 to all light source substrates 20 included in video display device 1. Note that paths to which control signals are distributed are indicated by alternate long and short dash lines in FIG. 11.

Power supplied from power supply substrate 93 is input to four light source substrates 20 disposed at the left end in FIG. 11. However, power input connector 28b and power output connector 29b of each of four light source substrates 20 (light source substrates 20a, 20b, 20d, 20f) disposed in the uppermost row in FIG. 11 are not available by the presence of reinforcing beam 11. Accordingly, power supplied from power supply substrate 93 is input to power input connector 28a of light source substrate 20d included in the four light source substrates at the left end and in the uppermost row, instead of power input connector 28b not available by the presence of reinforcing beam 11. On the other hand, power is input to power input connector 28b of each of other three light source substrates 20 of the four light source substrates at the left end, including light source substrate 20e. This power is through-output from power output connector 29a of light source substrate 20d, instead of power output connector 29b not available by the presence of reinforcing beam 11, and input to power input connector 28a of neighboring light source substrate 20f on the right side in the figure via cable 15. On the other hand, the power is through-output from power output connector 29b of each of other three light source substrates 20 of the light source substrates at the left end including light source substrate 20e, and input via cable 15 to power input connector 28b of each of neighboring light source substrate 20 on the right side in the figure. The power is distributed from one light source substrate 20 to other light source substrates 20 in this manner. Similar distribution is repeated to distribute the power supplied from power supply substrate 93 to all light source substrates 20 included in video display device 1. Note that paths to which power is distributed are indicated by alternate long and two short dashes lines in FIG. 11.

Light source substrates 20 included in video display device 1 are operated by control signals and power distributed in the manner described above. Each of the plurality of light emitting elements 21 is driven (dimmed) such that light is emitted with luminance corresponding to brightness indicated by the distributed control signal (brightness of an image within the corresponding area).

While light source substrates 20 arranged in the first direction are connected by cascade connection in the configuration example illustrated in FIG. 11, light source substrates 20 arranged in the second direction may be connected by cascade connection.

[2-2. Effects and Others]

According to this exemplary embodiment, as described above, the video display device may include a plurality of the light source substrates. The plurality of light source substrates may be arranged in the first direction, and arranged in the second direction perpendicular to the first direction.

In addition, according to the video display device, at least either the light source substrates arranged in the first direction and the light source substrates arranged in the second direction may be connected to each other by cascade connection.

Note that video display device 1 is an example of the video display device. Light source substrates 20 and light source substrates 20a through 20g are an example of the plurality of light source substrates. The direction in parallel with the long side of base plate 10 is an example of the first direction. The direction in parallel with the short side of base plate 10 is an example of the second direction. The configuration constituted by the plurality of connected light source substrates 20 illustrated in FIG. 11 is an example of cascade connection of the plurality of light source substrates.

According to video display device 1 having this configuration, reduction of cables necessary for connection can be achieved by electric connection of the plurality of light source substrates 20 (cascade connection).

In addition, a plurality of connectors for distributing signals or power are provided at positions different from each other in light source substrate 20. Herewith, connectors can be appropriately selected and used according to the positions of other members. For example, when one connector is unavailable to be used due to other member (such as reinforcing beam 11), instead of using the one connector, other connectors can be appropriately selected and used.

According to the video display device including the plurality of light emitting elements capable of independently dimming in the exemplary embodiment described above, reduction in size, thickness, and assembly cost of the video display device can be achieved.

Other Exemplary Embodiments

The first and second exemplary embodiments have been described by way of example of the technology disclosed according to the present application. The accompanying drawings and detailed description have been presented for this purpose.

Accordingly, for presentation of examples of the technology, constituent elements shown in the accompanying drawings and detailed description may contain not only constituent elements essential for solving problems, but also constituent elements not essential for solving problems. It should not be therefore directly determined that the constituent elements which are not essential elements are essential based on the consideration that these constituent elements are included in the accompanying drawings and detailed description.

Moreover, the exemplary embodiments described above are presented as examples of the technology of the present disclosure, wherefore various modifications, replacements, additions, omissions and the like may be made within the scope of the claims and an equivalent range. In addition, a different exemplary embodiment may be produced by combining respective constituent elements described in the first and second exemplary embodiments.

Note that errors and variations in positions, shapes and the like of respective members included in the foregoing description are allowed as long as intended advantageous effects are offered.

INDUSTRIAL APPLICABILITY

The present disclosure is applicable to a video display device. More specifically, the present disclosure is applicable to a television receiver, an image recording and reproducing device, a computer display device, and others.

REFERENCE MARKS IN THE DRAWINGS

1: video display device
1a: housing
10: base plate
11, 12: reinforcing beam
13, 13a: opening
14, 15: cable
20, 20a, 20b, 20c, 20d, 20e, 20f, 20g: light source substrate
21: light emitting element
22: second driver element
23: first driver element
24: opening
25: screw hole
26a, 26b: signal input connector
27a, 27b: signal output connector
28a, 28b: power input connector
29a, 29b: power output connector
30: reflection sheet
31: protrusion
32, 33: opening
35: adhesive tape
36: support pin
40: flatter
41, 41a: hole
50: optical sheet
60: mold frame
70: display panel
71: area 80: bezel
91: connection terminal substrate
92: signal processing substrate
93: power supply substrate

The invention claimed is:

1. A video display device comprising:
a display panel that displays an image based on an image signal; and
a plurality of light source substrates disposed on a rear side of the display panel,
wherein
each of the plurality of light source substrates includes:
   a plurality of light emitting elements disposed on a surface of the light source substrate on a side toward the display panel, and
   a plurality of driver elements that are disposed on the same surface of the light source substrate as the surface to which the plurality of light emitting elements are attached, and drive each of the plurality of light emitting elements,
the plurality of light source substrates are arranged in a first direction, and arranged in a second direction perpendicular to the first direction,
at least either the light source substrates arranged in the first direction and the light source substrates arranged in the second direction are connected to each other by a first cascade connection to distribute a control signal, and
at least either the light source substrates arranged in the first direction and the light source substrates arranged in the second direction are connected to each other by a second cascade connection to distribute power, and
wherein the plurality of light source substrates are configured such that:
the control signal is input to one light source substrate among the light source substrates arranged in the first direction and the light source substrates arranged in the second direction,
the input control signal is distributed to other light source substrates connected to the one light source substrate by the first cascade connection,
the one light source substrate distributes the control signal input to the one light source substrate to an adjacent other light source substrate arranged in the first direction and to an adjacent other light source substrate arranged in the second direction respectively, and
each of the other light source substrates further distributes the distributed control signal to other light source substrate adjacent to the other light source substrate in the first direction or in the second direction.

2. The video display device according to claim 1, wherein
each of the plurality of light emitting elements is disposed at a position of the light source substrate in correspondence with a corresponding one of areas different from each other in the display panel, and
each of the plurality of driver elements dims, in accordance with brightness of an image displayed in the corresponding one of the areas, each of the plurality of light emitting elements disposed at the position of the light source substrate in correspondence with the corresponding one of the areas.

3. The video display device according to claim 1, wherein
the plurality of light emitting elements are arranged at first intervals in a first direction, and arranged at second intervals in a second direction perpendicular to the first direction, and
each of the plurality of driver elements is disposed at a middle point of each first interval and each second interval, or near the middle point.

4. The video display device according to claim 1, wherein each of the plurality of light emitting elements is a light emitting diode (LED) constituted by a plurality of LED elements connected in series, and driven at a driving voltage selected in a range from 10 (V) to 50 (V) inclusive.

5. The video display device according to claim 1, wherein each of the plurality of light source substrates connected by the first cascade connection includes conductive line to through-output the control signal.

6. The video display device according to claim 1, wherein the plurality of light source substrates are configured such that:
the power is input to one light source substrate among the light source substrates arranged in one direction of the first direction and the second direction, and
the input power is distributed to other light source substrates connected to the one light source substrate by the second cascade connection.

7. The video display device according to claim 6, wherein the plurality of light source substrates are configured such that:
the one light source substrate distributes the power input to the one light source substrate to an adjacent other light source substrate arranged in the one direction, and
the other light source substrate further distributes the distributed power to other light source substrate adjacent to the other light source substrate in the one direction.

* * * * *